US008666700B2

(12) United States Patent
Robles-Kelly et al.

(10) Patent No.: US 8,666,700 B2
(45) Date of Patent: Mar. 4, 2014

(54) COMPACT REPRESENTATION OF A REFLECTANCE SPECTRUM (75) Inventors: Antonio Robles-Kelly, Kaleen (AU); Cong Phuoc Huynh, Braddon (AU)

(73) Assignee: National ICT Australia Limited (AU)

(*) Notice: Subject to any disclaimer, the term of this patent is extended or adjusted under 35 U.S.C. 154(b) by 365 days.

(21) Appl. No.: 12/999,924

(22) PCT Filed: Jun. 19, 2009

(86) PCT No.: PCT/AU2009/000793
§ 371 (c)(1),
(2), (4) Date: Mar. 28, 2011

(87) PCT Pub. No.: WO2009/152583
PCT Pub. Date: Dec. 23, 2009

(65) Prior Publication Data
US 2011/0191067 A1 Aug. 4, 2011

(30) Foreign Application Priority Data
Jun. 20, 2008 (AU) ................................ 2008903138

(51) Int. Cl.
H04B 15/00 (2006.01)
(52) U.S. Cl.
USPC ........................................ 702/189; 702/127
(58) Field of Classification Search
USPC .......................................................... 702/189
See application file for complete search history.

(56) References Cited

U.S. PATENT DOCUMENTS

| 5,815,401 A * | 9/1998 | Otsuki et al. .................. 700/189 |
| 7,145,664 B2 * | 12/2006 | Opsal et al. .................... 356/601 |
| 2004/0174363 A1 * | 9/2004 | Staples et al. ................. 345/442 |
| 2009/0048812 A1 * | 2/2009 | Hanisch et al. .................... 703/2 |

FOREIGN PATENT DOCUMENTS

JP 10-247249 9/1998

OTHER PUBLICATIONS

A. Certain, "Interactive Multiresolution Surface Viewing," 1996, SIGGRAPH '96, p. 91-98.*
PCT International Search Report and Written Opinion of the International Searching Authority, Application No. PCT/AU2009/000793, issued by the Australian Patent Office, Aug. 2009, 9 pages.
Tom Lyche and Knut Mørken, "Knot removal for parametric B-spline curves and surfaces", *Computer Aided Geometric Design*, 4, pp. 217-230, 1987.
David L. B. Jupp, "Approximation to Data by Splines with Free Knots", SIAM J. Number. Anal., vol. 15, No. 2, Apr. 1978, pp. 328-343.

(Continued)

*Primary Examiner* — John Breene
*Assistant Examiner* — Stephanie Bloss
(74) *Attorney, Agent, or Firm* — Snell & Wilmer L.L.P.

(57) ABSTRACT

The invention concerns the compact representation of a reflectance spectrum of a material. For example, for in compression, identification and comparison of reflectance spectrum data of multiple materials. The compressed representation interpolating a spline curve to the reflectance spectrum data, the spline curve having a set of control points, a knot vector, and representing wavelength and reflectance as functions of an independent parameter (42). Then removing one or more knots from the knot vector that minimise a cost function in a parameter domain of the spline curve based on the wavelength function (44). Aspects of the invention include a method, software, a computer system and the compact representation itself.

21 Claims, 7 Drawing Sheets

(56) References Cited

OTHER PUBLICATIONS

W. Tiller, "Knot-rmoval algorithms for NURBS curves and surfaces", *Computer Aided Geometric Design*, vol. 24, No. 8, Aug. 1992, pp. 445-453.

Catherine Cusimano and Sony Stanley, "Circular Bernstein-Bézier spline approximation with knot removal", *Journal of Computational and Applied Mathematics*, vol. 155, 2003, pp. 177-185.

T. Lyche and K. Mørken, "A Data-Reduction Strategy for Splines with Applications to the Approximation of Functions and Data", *IMA Journal of Numerical Analysis*, vol. 8, 1998, pp. 185-208.

Cong Phuoc Huynh and Antonio Robles-Kelly, "A NURBS-Based Spectral Reflectance Descriptor with Applications in Computer Vision and Pattern Recognition", IEEE 2008, 8 pages.

N. F. Berk and C. F. Majkrzak, "Using parametric B splines to fit specular reflectivities", Physical Review B, vol. 51, No. 17, May 2005. pp. 11296-11309.

Fabrice Rossi et al., "Fast Selection of Spectral Variables with B-Spline Compression", arXiv:0709.3639v1[es.LG](online), Sep. 23, 2007, retrieved from the internet Jan. 13, 2009 <URL:http://lanl.arxiv.org/abs/0709.3639>.

L. Piegl et al., "The NURBS Book", Springer-Verlag, London, UK 1995.

Ety Lee, "Choosing nodes in parametric curve interpolation", Computer-Aided Design, 21(6), 1889, pp. 363-370.

W. Tiller, "Knot-removal algorithms for NURBS curves and surfaces", Computer-Aided Design, 24(8), 1992, pp. 445-453.

Z. Fu et al., "On Automatic Absorption Detection for Imaging Spectroscopy: A Comparative Study", IEEE Transactions on Geoscience and Remote Sensing, 45 2007, pp. 3827-3844.

* cited by examiner

Algorithm 1 $KnotRemoval(Q, p, \alpha, target)$

Require: $Q, p, \alpha, target$ $Q$: The given data points $p$: The degree of basis functions $\alpha$: The balance factor $target$: The target number of knots $U_0, P_0$: the returned knots and control points 1: $(U_0, P_0) \leftarrow Interpolate(Q, p)$
2: while true do
3:     $Reduction_{max} \leftarrow -1$ {Highest cost reduction}
4:     for all $u \in U_0$ do
5:       $(flag, U_1, P_1) \leftarrow RemoveKnot(u)$ {$flag$ is true if knot $u$ is removable}
6:       if $flag$ then
7:          $SSE_{old} \leftarrow SSE(U_0, u)$
8:          $SSE_{new} \leftarrow SSE(U_1, u)$
9:          $Reduction \leftarrow (1 - \alpha) + \alpha(SSE_{old} - SSE_{new})$
10:          if $Reduction > Reduction_{max}$ then
11:            $Reduction_{max} \leftarrow Reduction$
12:            $candidate \leftarrow u$
13:          end if
14:       end if
15:     end for
16:     if $Reduction_{max} < 0$ then
17:       return $U_0, P_0$
18:     end if
19:     Remove the $candidate$ one time
20:     Remove a data point corresponding to $candidate$
21:     $Q' \leftarrow$ The remaining data points.
22:     $(U_0, P_0) \leftarrow Interpolate(Q', p)$
23: end while
24: return $U_0, P_0$

Fig. 3

Algorithm 2 $IterKnotRemoval(Q, p, \alpha, target)$

Require: $Q, p, target$

$Q$: The given data points

$p$: The degree of basis functions

$target$: The target number of knots

$\alpha$: The balance factor

$U_2, P_2$: The final knots and control points

1: $samples \leftarrow Q$
2: while $|U_2| > target$ do
3:     $(U_1, P_1) \leftarrow Interpolate(samples, p)$
4:     $(U_2, P_2) \leftarrow KnotRemoval(samples, p, \alpha, target)$
5:     Select Parameters $(t_1, \ldots, t_l)$
6:     $samples \leftarrow Resample(p, U_2, P_2, t_1, \ldots, t_l)$
7: end while
8: return $U_2, P_2$

Algorithm 3 $GlobalInterpolation(W, R, p)$

Require: $W, R, p$ $W$: The sampled wavelengths, where $W_k$ is the wavelength at the $k^{th}$ band.

$R$: The measured reflectance, where $R_{v,k}$ is the measured reflectance at the $k^{th}$ band of the spectrum with index $v, k = 1, \ldots, l$.

$p$: The degree of basis functions.

1: $l \leftarrow$ the number of bands (wavelengths)

2: $N \leftarrow$ the number of spectra

3: $m \leftarrow l + p + 1$

4: for reflectance spectrum with index $v$ do

5: $\quad d_v \leftarrow \sum_{k=2}^{l} ((R_{v,k} - R_{v,k-1})^2 + (W_k - W_{k-1})^2)^{\frac{1}{4}}$ 6: $\quad$ Compute the parameters values $\bar{t}_{v,k}$, where $k = 1, \ldots, l$, such that $\bar{t}_{v,1} = 0$, $\bar{t}_{v,l} = 1$, and
$\bar{t}_{v,k} = \bar{t}_{v,k-1} + \frac{((R_{v,k} - R_{v,k-1})^2 + (W_k - W_{k-1})^2)^{\frac{1}{4}}}{d_v}$ where $k = 2, \ldots, l$.

7: end for

{Compute the common parameter values by averaging}

8: $t_k \leftarrow \frac{1}{N} \sum_v \bar{t}_{v,k} \forall k = 1 \ldots l$

{Compute the common knot vector for all spectra}

9: $u_k = 0 \forall k = 1, \ldots, p+1$, $u_k = 1 \forall k = m - p, \ldots, m$

10: $u_{k+p} = \frac{1}{p} \sum_{i=k}^{k+p-1} t_k \forall k = 2, \ldots, l - p$

11: $U \leftarrow [u_1, \ldots, u_m]^T$ {The knot vector}

12: Initialise array A to zero

13: for $k \leftarrow [1 \ldots l]$ do

14: $\quad span \leftarrow FindSpan(l, p, t_k, U)$

15: $\quad A[k][span - p \ldots span] \leftarrow BasisFunctions(span, t_k, p, U)$ 16: end for

17: Let $x$ be the solution of $Ax = W$, where $x$ is an $l$-element vector

18: for reflectance spectrum with index $v$ do

19: $\quad$ Let $y_v$ be an $l$-element vector such that $Ay_v = R_v$, where $R_v = [R_{v,1}, R_{v,2}, \ldots, R_{v,l}]^T$ 20: end for

{$x$: the control point coordinates in the wavelength dimension.}

{$y_v$: the control point coordinates in the reflectance dimension for the spectrum with index $v$.}

21: return $U, x, y_v \forall v$

Fig. 7

COMPACT REPRESENTATION OF A REFLECTANCE SPECTRUM

TECHNICAL FIELD

The invention concerns the compact representation of a reflectance spectrum of a material. Specifically, but not limited to, the invention concerns the compression, identification and comparison of reflectance spectrum data of multiple materials. Aspects of the invention include a method, software, a computer system and the compact representation itself.

BACKGROUND ART

The term "spectra" describes the distribution of light energy across a continuous range of wavelengths. The reflectance spectrum (also known as 'spectral signature') of a material, which includes the proportion of light reflected from it, is a characteristic of the material.

The development of image sensor technology has made it possible to capture image data covering a broad spectrum of wavelengths. In contrast with trichromatic sensors, multispectral and hyperspectral sensing devices can acquire wavelength-indexed reflectance and radiance data in hundreds to thousands of bands across a broad spectrum. To date, these spectra are acquired and stored in discrete wavelength-indexed measurements.

As a result, the size of reflectance or radiance spectrum data is dependent upon the number of wavelengths, or spectral resolution. For high-resolution spectra, each signature can consist of hundreds of values, i.e. bands, that require large storage spaces in order to be stored.

SUMMARY OF THE INVENTION

In a first aspect the invention is a method of producing a compact representation of spectrum data of a first material, the method comprising the following steps:
 (a) receiving or accessing the spectrum data comprised of pairs of wavelength and reflectance values;
 (b) interpolating a spline curve to the spectrum data, the spline curve having a set of control points, a knot vector, and representing wavelength and reflectance values as functions of an independent parameter; and
 (c) removing one or more knots from the knot vector that minimise a cost function in a parameter domain of the spline curve.

It is an advantage of the invention that the spectrum data can be represented using the set of control points and the knot vector of a spline curve. The spline curve is fitted to the spectrum data by the interpolation of step (b) so as to respect the data and step (c) reduces the number of parameters used to represent that data. In this way, the method offers a compact representation of the spectrum data that provides saving in storage space by reducing potentially thousands of samples to several control points and knots. Furthermore, the trade-off between compression ratio and representation quality is controlled by step (c). Yet further advantages include that that control points and knot vector representation is robust to changes in illumination, noise and scene geometry.

Splines are used in graphics and computer aided designs. Splines are designed and used to represent car bodies and ship hulls. These are free-form entities viewed as 3D surfaces. Spectrum data are understood as a 2D wavelength-indexed signal. Therefore, the invention represents an inventive change in viewpoint with respect to the geometric interpretation of spectral signatures.

The method may further comprise the step of:
 (d) displaying the spectrum data as a spline curve based on the control point set and the knot vector. The spline curve may be a Non Uniform Rational B-Spline curve (NURBS).

Minimising the cost of step (c) may be based on the reflectance function. The cost function may be defined by squared differences between the spectrum data and the spline curve. That is, the cost function is based on the sum of squared differences between the reflectance value of each pair of wavelength and reflectance values, and a reflectance value given by the reflectance function for the parameter corresponding to the same wavelength value of that pair. Put another way, each wavelength corresponds to an independent parameter that is used by both the wavelength and reflectance functions. The squared differences are defined in the domain of the independent parameter, which is also called the parameter domain.

The cost function may also penalise a large number of knots.

The wavelength and reflectance functions may share the same basis functions that are based on the (i.e. same) knot vector.

The step (c) may further comprise the steps of:
 (i) identifying a set of candidate removable knots;
 (ii) determining an approximate cost reduction removing each candidate knot will yield;
 (iii) selecting a first knot from the set of candidate knots that approximately yields a maximum cost reduction according to the cost function;
 (iv) removing the first knot from the knot vector; and
 (v) removing a pair of wavelength and reflectance values from the reflectance spectrum data in the locality influenced by the removed first knot.

The method may further comprise the step of:
repeating steps (b) and (c) until the approximate cost reduction of the removal of each remaining knot will yield is less than a determined value, such as a value that indicates that no further knot removal will yield a lower cost or a predetermined number of knots.

The method may further comprise the steps of:
removing a pair of wavelength and reflectance values from the spectrum data in the locality of a knot removed in step (c); and
re-sampling the spectrum data in the parameter domain and performing step (b) and (c) on the re-sampled spectrum data.

Repetitions of (c) (ii) may comprise the steps of:
determining the approximate cost reduction of the removal of each candidate knot will yield by updating each approximate cost reduction by the effect the removal of the previous knot has made.

It is an advantage of at least one embodiment of the invention that it modifies the traditional interpolation and knot removal method as an optimisation procedure. In this approach, the interpolation itself is not standard to NURBS, but a modified one that optimises the representation with respect to the goodness of fit and representation dimensionality.

The spectrum data includes raw spectral data and/or spectral images. The data may be comprised of discrete samples.

The data may be received from a hyperspectral imaging devices and spectrometers.

The method may further comprise the step of providing the compact representation to a identifier to identify a second material.

The method may further comprise producing a compact representation of reflectance spectrum of a second material by performing steps (a), (b), (c) and (d) on the spectrum data of the second material.

The method may further comprise the steps of:
when a material type of the first material is known, training an identification algorithm to identify the material type; and
using the identification algorithm and the compact representation of the second material to identify the second material as the material type. The resolution of the spectrum data of the first and second material may be different.

The method may further comprise comparing the spectrum data of the first and second material by comparing their respective compact representations (i.e. control point set and knot vector). The result of the comparison may be to identify the second material as being the same or different to the first material. The spectrum data of the first material may be captured by a device having a different resolution to a device that captured the reflectance spectrum data of the second material. Spectrum data acquired through different instruments are often incompatible with one another due to taking samples at differing spectral frequencies. It is an advantage of this embodiment that use of splines provides a unified mathematical basis for analyzing different reflectance spectra acquired by different instruments by common treatments. The use of splines also provides a numerically stable and efficient closed-form representation of spectra. It is also robust to noise since splines are invariant to geometric transformation and exhibit local support, which implies that local perturbations and corruption in the spectrum data do not affect the rest of the wavelength-indexed measurements.

The method may further comprise producing a compact representation of spectrum data of the first material and of spectrum data of a second material, wherein step (b) comprises interpolating spline curves to each the reflectance spectrum data of the first and second material, such that the spline curves share the knot vector, wavelength function and parameter values, and each spline curve has its own reflectance function and control points. Minimizing the cost function of step (c) may comprise minimizing for each spline curve, the sum of squared differences between the reflectance value of each pair of wavelength and reflectance values, and a reflectance value given by the reflectance function for the parameter corresponding to the same wavelength averaged over all the spectra.

A further aspect, the invention provides software, that when installed on a computer system causes it to operate in accordance with the method described above.

In yet another aspect, the invention provides a computer system to produce a compact representation of a spectrum data of a first material, the computer system comprising:
an input port to receive the spectrum data (if received);
a processor to perform steps (b) and (c) described above; and
storage means to store the set of control points and a knot vector of the compact representation.

The processor may further operate to perform step (d) and the computer system may further comprise an output device to display the NURBS representation.

A further aspect of the invention provides a compact representation of spectrum data stored on a computer readable medium, wherein the compact representation was produced as described above.

BRIEF DESCRIPTION OF THE DRAWINGS

An example of the invention will now be described with reference to the accompanying drawings in which:
FIG. 7 shows Algorithm 3 which summarises the interpolation step for use with multiple reflectance spectra.

BEST MODES OF THE INVENTION

Figure 1:
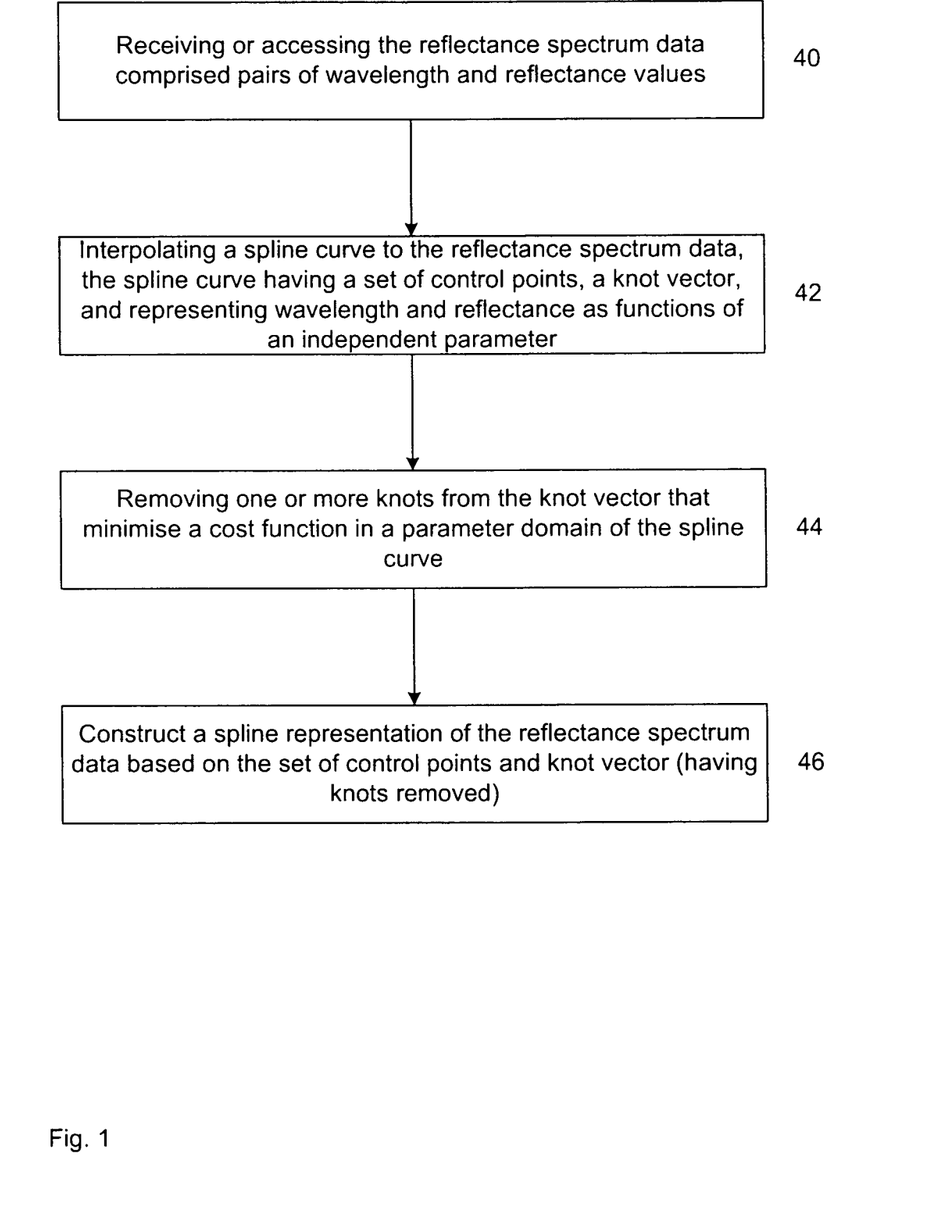
FIG. 1 is a flowchart of the method of the example.

In this example a reflectance representation based on the control points resulting from the interpolation of Non-Uniform Rational B-Spline (NURBS) curves to multispectral data will be described with reference to the flowchart of FIG. 1. The interpolation is based upon a knot removal scheme in the parameter domain. Thus, we exploit the local support of NURBS so as to recover a compact form of the spectral signatures data obtained from hyperspectral imaging devices and spectrometers.

Figure 2:
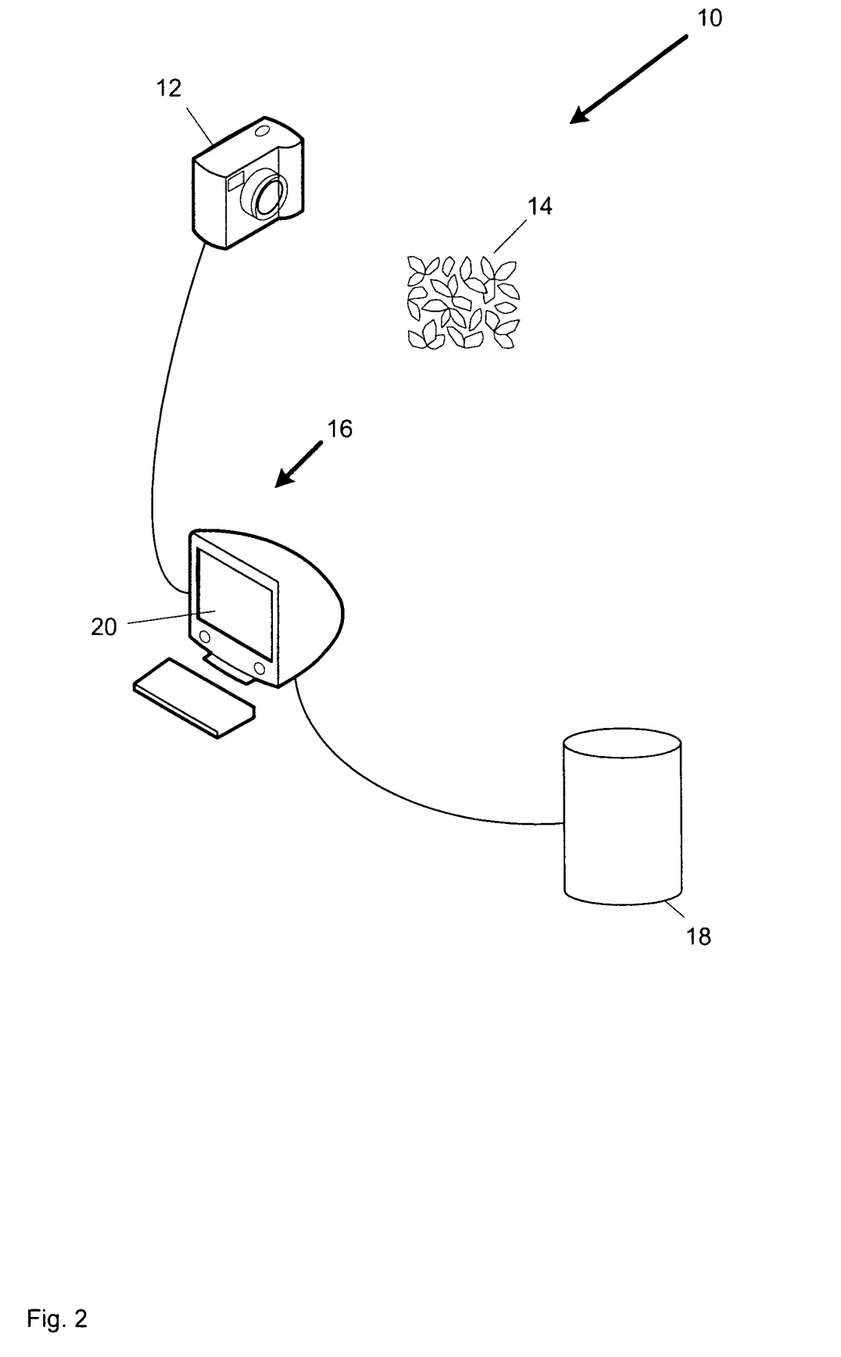
FIG. 2 is a schematic drawing of a computer system of the example.

Referring now to FIG. 2, the computer system 10 used in this example to perform the method will now be described. A spectrometer 12 captures reflectance spectrum data of a leaf 14 that is in field of view of the spectrometer 12. This data is then provided to a computer 16 by direct connection to an input port (not shown) to be received 40 by the computer 16. The reflectance spectrum data is then stored on a storage medium of the computer 16, such as an external datastore 18 or internal (not shown).

The computer 16 has installed software to cause its processor to assess the stored reflectance spectrum data to perform the method shown in FIG. 2, including creating a compact representation of the data. The software also allows the processor to perform algorithm training and further analysis of the data such as comparison and identification of material as described in greater detail below.

The compact representation may replace the stored reflectance spectral data stored on the datastore 18. The NURBS may be displayed on the output device, in this case a monitor 20, of the computer system.

NURBS-Based Representation

NURBS-based representation can cope with densely sampled reflectance spectra, which could potentially consist of hundreds of data points over the visible spectrum. For purposes of classification, long feature vectors has been known to degrade performance since they incur computational cost and learning-theoretic limitations. Thus, it is desirable that the representation has the most discriminative power with the lowest possible dimensionality.

We will now describe NURBS curves and relate them to an interpolation step 42 on the spectrum. We then formulate the reflectance spectrum representation through performing knot removal 44 by minimising a cost function in the parameter domain of the spline curve.

Basic Formulation

A B-spline is a function that has support with respect to degree, smoothness and domain partition. The smoothness property makes the interpolating curve robust to noise. The local support property permits the modifications of the curve over a given wavelength range while keeping the rest of the spline unaffected.

First, we require some formalism. Since spectra are a function of wavelength λ we restrict our analysis to the two-dimensional case. A p-degree B-Spline curve C in $\mathbb{R}^2$ composed of n segments is a function in the parameter domain U of the univariate variable t given by the linear combination $$C(t) = \sum_{i=0}^{n} N_{i,p}(t) P_i \qquad (1)$$

where $P_i=(x_i, y_i)$ are the 2D control points, and $N_{i,p}(t)$ are the p-degree B-spline basis functions defined on the parameter domain [1]. The coordinates (x, y) of a point on the curve are expressed in the parametric form $$x(t) = \sum_{i=0}^{n} N_{i,p}(t) x_i \qquad (2)$$

$$y(t) = \sum_{i=0}^{n} N_{i,p}(t) y_i \qquad (3)$$

A B-Spline is characterised not only by the control points but also by a knot vector $U=\{u_0, \ldots, u_m\}$, where m=n+p+1. With these ingredients, we can define the $i^{th}$ B-spline basis function $N_{i,p}(t)$ of degree p as follows $$N_{i,0}(t) = \begin{cases} 1 & \text{if } u_i \leq t \leq u_{i+1} \\ 0 & \text{otherwise} \end{cases}$$

$$N_{i,p}(t) = \frac{t - u_i}{u_{i+p} - u_i} N_{i,p-1}(t) + \frac{u_{i+p+1} - t}{u_{i+p+1} - u_{i+1}} N_{i+1,p-1}(t)$$

Note that the basis function $N_{i,p}(t)$ is a piecewise polynomial assuming non-zero values only on the interval $[u_i, u_{i+p+1})$. Note that the basis function only affects the shape of the spline in a local section governed by the parameter t.

To formulate the representation, we treat a spectrum as a collection of spectral samples with two coordinates $(\lambda_k, R_k)$, where $R_k$ is the $k^{th}$ reflectance sample at the wavelength $\lambda_k$. Thus, the parametric form of a B-spline curve through these data points is obtained by representing the wavelength and reflectance as two functions of t which we denote λ(t) and $\Re$(t) respectively. The representation is then governed by a knot vector and a control point-set which minimise a cost function defined by squared differences between the measured reflectance $R_k$ and the one computed in the parameter domain $\Re$(t). We depart from an initial interpolation of the sampled reflectance spectrum so as to arrive at the curve that minimises the cost function through a knot removal algorithm.

Once the control points and knot vector that minimise the cost function are at hand, we proceed to construct 46 the NURBS representation. We do this by selecting the most discriminative components from the control point-set and the knot vector U. We observe that the knots and x-coordinates of each control point, i.e. the $x_i$ variables in Equation 2, vary in a specific neighbourhood of the parameter domain where they govern the support of the NURBS. This is reflected in the wavelength domain and, therefore, their variations across the spectra may not be as related to the spectrum shape as the y-coordinates of the control points, i.e. the $y_i$ variables in Equation 3. In other words, the variations in the y coordinates of the control points primarily determine the general shape of the spectrum.

Directed Interpolation

As mentioned earlier, in statistical learning, a representation is desired to retain statistical information that gives high discriminative power. Hence, we devise a target function to optimise the choice of the interpolating B-spline curve 42 for each reflectance spectrum. Given a surface with reflectance $R_k$ at each wavelength $\{\lambda_k\}$, k=1, . . . , l, we aim to recover an interpolating curve C with control points $P_i=(x_i, y_i)$ and a knot vector U satisfying the following parametric form $$\lambda(t) = \sum_{i=0}^{n} N_{i,p}(t) x_i$$

$$\Re(t) = \sum_{i=0}^{n} N_{i,p}(t) y_i$$

The cost of interpolating the points $(\lambda_k, R_k)$ using the B-spline curve above is then given by $$K = \alpha \sum_{k=1}^{l} (\Re(t_k) - R_k)^2 + (1-\alpha)|U| \qquad (6)$$

where |•| denotes the length of the vector argument and α is a constant between zero and unity. The domain parameter $t_k \in U$ corresponds to the $k^{th}$ wavelength, i.e. $\lambda_k = \lambda(t_k)$ Note that the first term in Equation 6 above is the weighted sum of squared errors in the 2D space defined by the wavelength-reflectance pairs, whereas the second term is the weighted number of knots. Thus, the optimal interpolating curve minimises the sum of squared distances $(\Re(t_k)-R_k)^2$, while penalising a large number of knots. This imposes a balance in the resulting curve between describing the general shape of the reflectance data, while minimising the number of knots required to describe it. This trade-off is governed by α. A small value of α favours a short representation over one that respects the general shape of the original data. Also, note that, as the number of knots decreases, the interpolating curve becomes smoother. Thus, an appropriate choice of α makes the representation less susceptible to noise while preventing over-smoothing and loss of detail.

Minimisation of the Cost Function

The knot removal 44 aims at minimising the interpolation cost introduced in Equation 6. We depart from an initial approximation of the NURBS curve to the reflectance spectrum under study. To this end, we apply the curve interpolation algorithm in [1], which employs the centripetal method of Lee [2] to recover parameter values for every control point. With this initial approximation at hand, we proceed to remove knots sequentially using a knot removal method akin to that in [3]. The algorithm is a two-pass process. In the first pass, removable knots are identified. In the second pass, knots are sequentially removed and new control points are computed. Although being effective, this algorithm does not automatically determine the best knot to remove at each pass, but rather assumes the knot to be removed to be designated as input. The knot removal algorithm of this example computes the potential cost reduction for removable knots. Once these knots and their contributions to the cost function are at hand, we employ Tiller's algorithm [3] to remove them.

Thus, our algorithm selects amongst the candidate knots the one that yields the maximum cost reduction. Also, note that, following the strategy above, the parameter $t_k$ should be recovered for every wavelength $\lambda_k$. This is not a straightforward task since the function $\lambda(t_k)$ is expressed as a linear combination of the basis functions $N_{i,p}$ given in Equation 4. Nonetheless, this equation may not be solved analytically, we adopt a numerical approach in order to find an approximate solution and reduce the computational cost involved. In fact, it is reasonable to assume that the wavelength $\lambda(t_k)$ is an increasing function in the parameter domain. Therefore, for a given wavelength $\lambda_k$, we can perform a binary search for $t_k$ such that $\lambda_k \sim \lambda(t_k)$.

Implementation

The knot removal process 44 is an iterative method in which, at every iteration, we locate the knot that maximises the reduction in the cost K. The knot removal algorithm is summarised in Algorithm 1, where the sum of squared errors before and after knot removal are denoted as $SSE_{old}$ and $SEE_{new}$, respectively. The RemoveKnot(•) procedure implements the knot removal algorithm in [3].

As a result of the local support property of B-spline curves, the removal only affects the curve partition in the neighbouring sections of the knot. Thus, for the sake of efficiency, the change in sum of squared errors can be computed as the change within the neighbourhood of the removal candidate u to profit from the local support of the NURBS. To do this, we use the span of the NURBS [1] and employ lists to back-track their effect across the spline.

Figure 3:
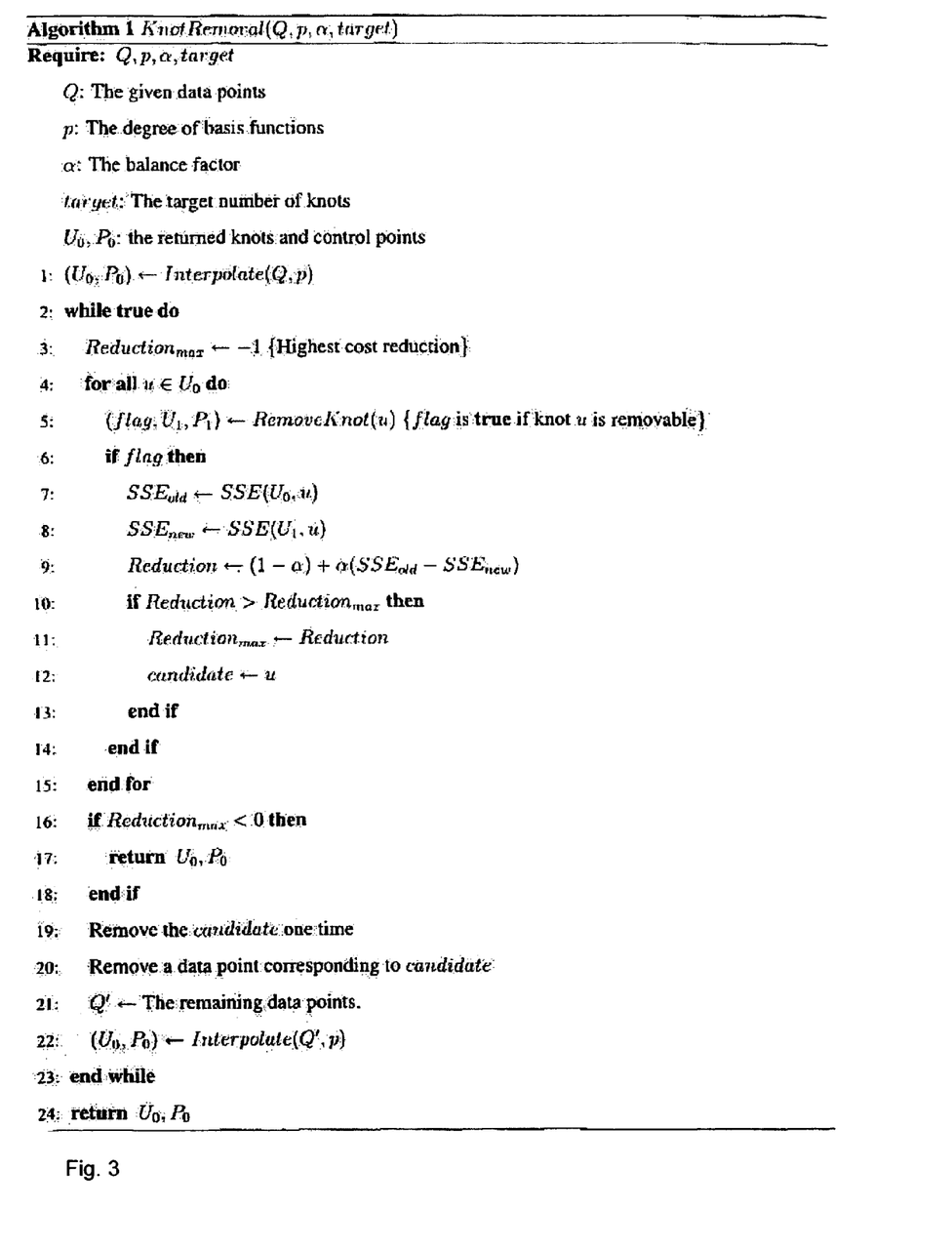
FIG. 3 shows Algorithm 1 which summarises the knot removal method of the example.
Figure 4:
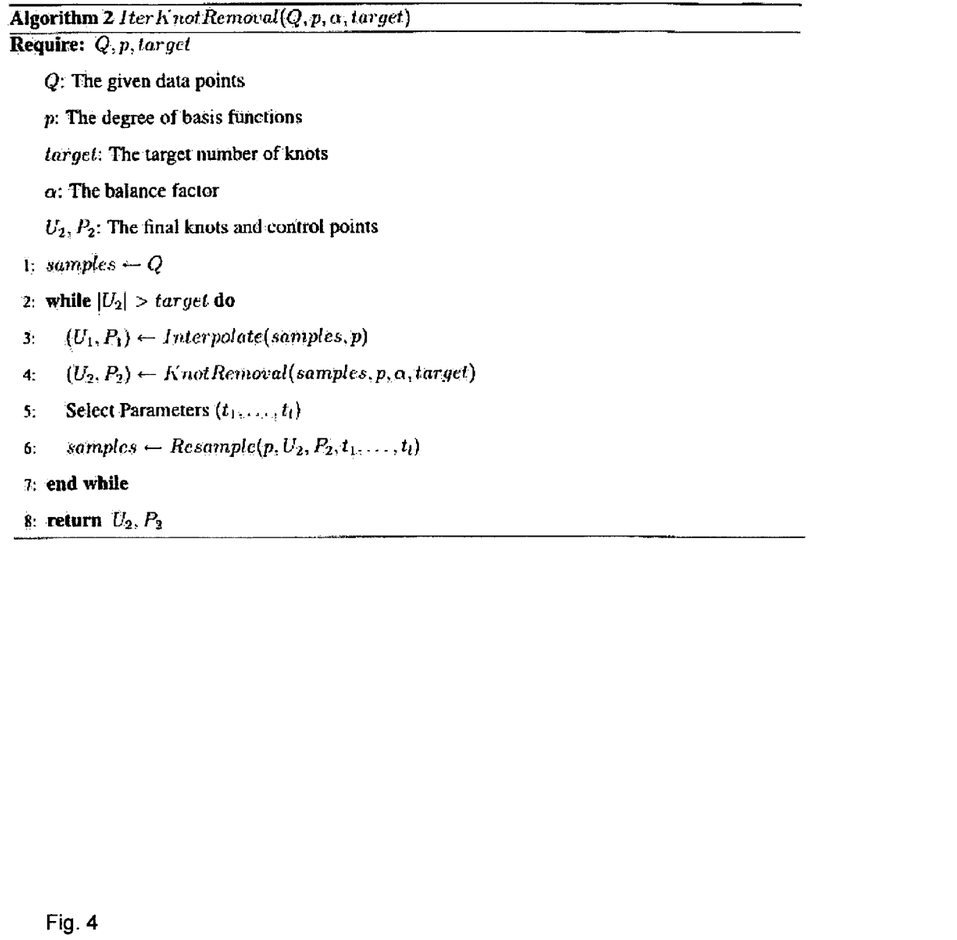
FIG. 4 shows Algorithm 2 shows the iterative applications of the knot removal algorithm with re-sampled data points in the parameter domain.

The knot removal algorithm terminates when removing any knot cannot further reduce the interpolation cost. However, the number of knots should be imposed as a hard constraint since representations should be normalised in length before they are input to classifiers. Hence, the knot removal method in Algorithm 1 of FIG. 3 is applied recursively by resampling data points in the parameter domain. The pseudocode for the recursion on the knot removal algorithm is shown in Algorithm 2 of FIG. 4. The resampling operation allows further knots to be removed by reducing the number of curve sections without changing the distribution of the control points from the original data. Note that smoothing becomes most acute when the parameter values for the resampling operation are given by the midpoints of the knot spans. Thus, we sample parameter values near the resulting knots to preserve the shape of the original curve.

Figure 5:
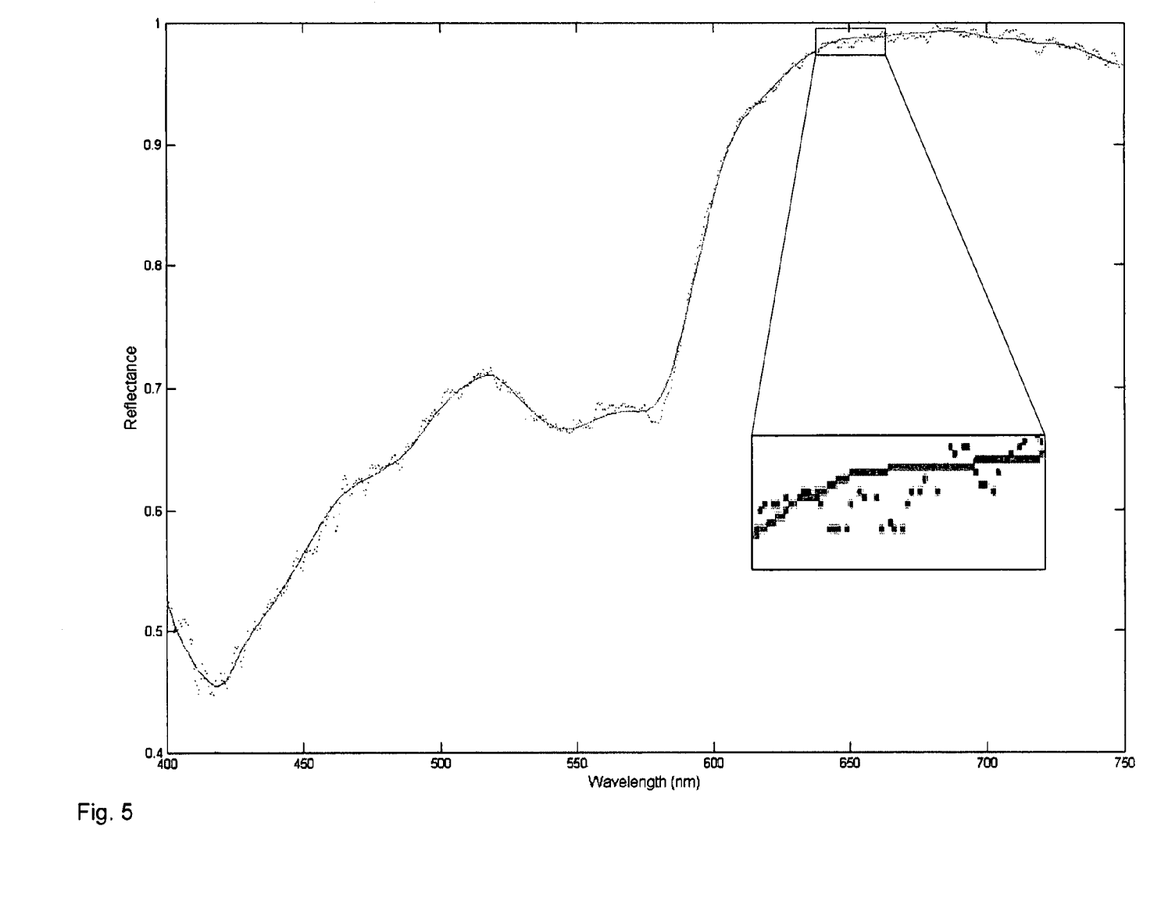
FIG. 5 shows the NURBS curves achieved by removing knots from the reflectance spectra of human skin.
Figure 6:
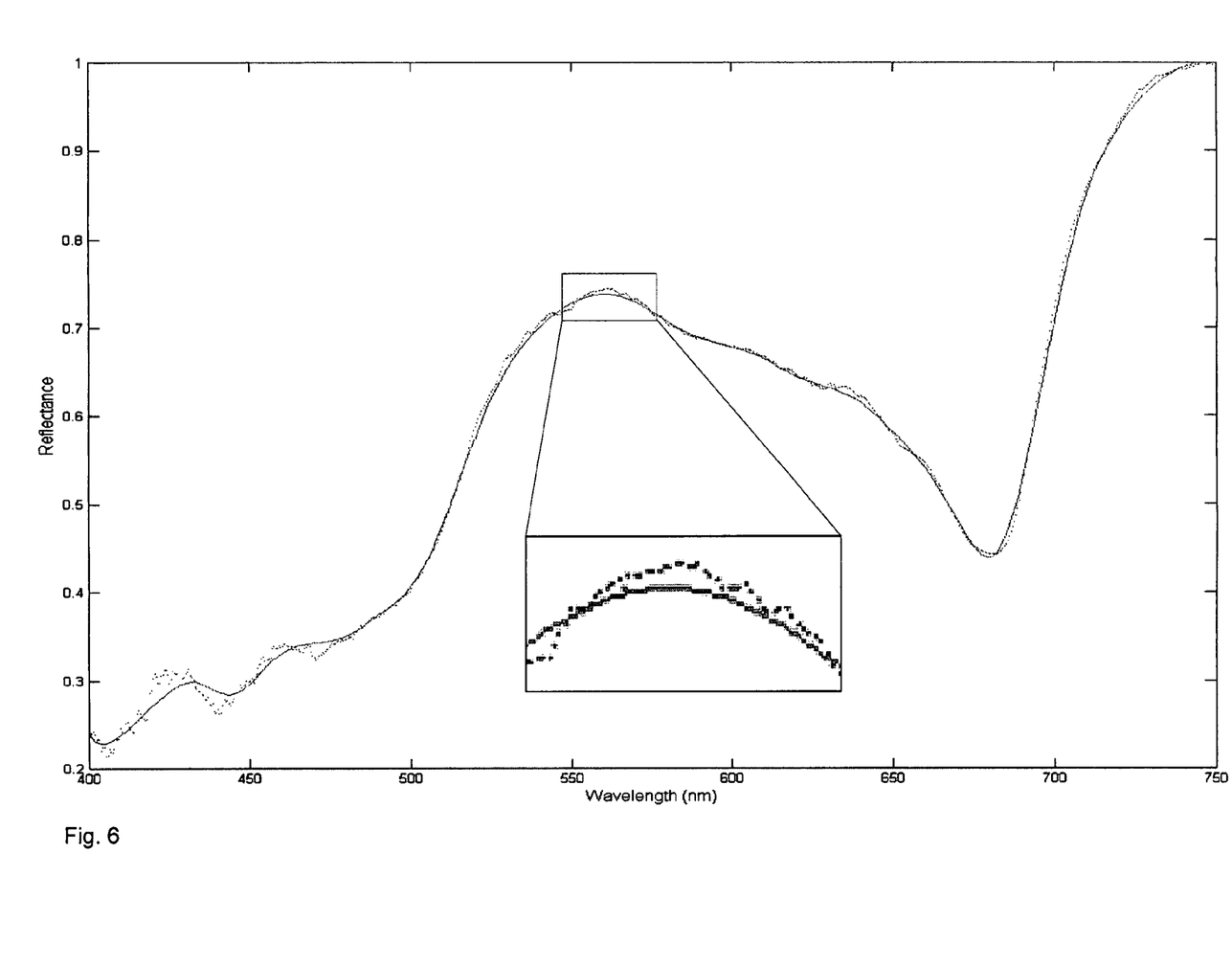
FIG. 6 shows the NURBS curves achieved by removing knots from the reflectance spectra of a leaf.

FIG. 5 shows the resulting NURBS curves (continuous line) achieved by removing knots from the reflectance spectra (shown as dots) of human skin and FIG. 6 a leaf. The original reflectance data are sampled every 4 nm. In these figures, we have performed, iterative knot removal with B-Spline basis functions of degree 3. This yielded 34 knots and 30 control points per curve. Note that, while this number of knots is considerably less than the number of original data points, the resulting NURBS curve still aligns well with the original data as can be seen by the lack of two visibly different curves in FIGS. 5 and 6. Thus, our cost-optimal knot removal algorithm is able to perform dimensionality reduction while respecting the global shape of the reflectance spectra. This is evident throughout the whole spectrum between 400 and 750 nm.

The NURBS-based representation provides a means to compression and efficient storage of spectral data, such as location-wise reflectance spectra measured by spectrometers and hyperspectral images captured by hyperspectral sensors. The most straightforward option here is to denote the quality factor as $$\beta = \frac{1}{\alpha}$$

and store the control points and knot vectors as an alternative to the raw spectra.

A further example if the invention will now be described that concerns producing a compact representation of reflectance data of two materials.

In pattern recognition and image coding, the data under study is commonly represented by compact features that rely on a common basis. Motivated by this goal, we propose a NURBS-based representation for a given collection of reflectance spectra that is compact in the spectral domain. The purpose of this representation is threefold. Firstly, it provides a common B-spline basis to represent and compare reflectance spectra of different materials, possibly captured by heterogeneous sensing devices. The continuity, differentiability and local support properties of these basis functions enables further functional analysis of spectral signatures. Secondly, it allows the recognition of materials based on compact spline features. Thirdly, it facilitates the compression of hyperspectral images through the reduction in the spectral domain.

The formulation of the NURBS-based descriptor in this case is built on that for a single spectrum. Furthermore, subject to the motivation above, it is required that all the reflectance spectra under study are represented by the same B-spline basis functions $N_{i,p}(t)$, i=0, ..., n. This implies that, for a collection of spectra signatures sampled in the same wavelength range, their NURBS-based representations share the same knot vector and parameter values corresponding to the wavelengths.

Suppose that we are given a collection of reflectance spectra $R_v = [R_{v,1}, R_{v,2}, \ldots, R_{v,l}]^T$, where v denotes the spectrum index (or pixel index in case of hyperspectral images) and $R_{v,k}$ is the measured reflectance of the spectrum v at the wavelength $\{\lambda_k\}$, k=1, ..., l. Treating each reflectance spectrum as a set of points with two coordinates made up of reflectance-wavelength pairs, we aim to recover a B-spline curve for each spectrum such that they share the same basis functions, knot vector and control points in the wavelength dimension. The feature that distinguishes between spectra is the control points in the reflectance dimension.

Formally, the problem is formulated as follows. For the spectrum index v, we aim to $$\lambda(t) = \sum_{i=0}^{n} N_{i,p}(t) x_i \tag{7}$$

$$R_v(t) = \sum_{i=0}^{n} N_{i,p}(t) y_{v,i} \tag{8}$$

recover a B-spline curve $C_v$ with control points $P_{v,i}=(x_i, y_{v,i})$, $i=0, \ldots, n$. and a knot vector U common for all the spectra. The coordinates of this curve are defined as functions of an independent parameter t as Note that in Equations 7 and 8, the basis functions $N_{i,p}(t)$ and the wavelength interpolation function $\lambda(t)$ are the same for all the given spectra. In contrast, the reflectance interpolation function $R_v(t)$ and its associated control point coordinates $y_{v,i}$ vary with the spectral signature. Thus, the representation of a collection of spectral signatures effectively consists of the knot vector U, the control points' wavelength coordinates $[x_o, \ldots, x_n]^T$ and the control points' reflectance coordinates $[y_{v,o}, \ldots, y_{v,n}]^T$ corresponding to the given spectral signatures.

In principle, a common function basis for all the spectra can be achieved as follows. The common knot vector and the independent parameter value $t^k$ are computed as the average of those of individual spectra, over all the spectra or the spatial dimensions of a hyperspectral image. This operation can be performed in the global interpolation steps in Lines 1 and 22 of Algorithm 1 of FIG. 3.

Algorithm 3 of FIG. 7 provides a procedure to interpolate the given collection of reflectance spectra by a number of B-Spline curves sharing the same knot vector, basis functions and control points in the wavelength dimension.

The flow of Algorithm 3 is described as follows. First, we employ the centripetal method (in Lines 4-7) by Lee [2] to compute parameter values $\bar{t}_{v,k}$ separately for each reflectance spectrum. Note that we can employ any other methods to compute these parametric values as an alternative to the centripetal method. After obtaining the average $t^k$ of these parameter values across all the spectral signatures, the common knot vector is computed in Lines 9-11. In addition, the Find-Span(l, p, $t_k$, U) procedure in Line 14 obtains the knot span index of $t^k$ using a binary search method. Subsequently, the BasisFunctions(span, $t_k$, p, U) procedure in Line 15 evaluates the basis functions at the parametric point $t^k$. The control point coordinates are solutions to the linear equations presented in Lines 17 and 19.

Next we formulate the cost of interpolating the curves above through the set of wavelength-indexed reflectance spectra $R_v=[R_{v,1}, R_{v,2}, \ldots, R_{v,l}]^T$. Suppose that the parameter $t_k \in U$ corresponds to the $k^{th}$ wavelength, i.e. $\lambda_k=\lambda(t_k) \forall k$, the interpolation cost using the B-spline curves above is then given by $$K = \alpha \frac{1}{N} \sum_v \sum_{k=1}^{l} (R_v(t_k) - R_{v,k})^2 + (1-\alpha)|U| \quad (9)$$

where N is the number of spectral signatures, |.| denotes the length of the vector argument and $\alpha$ is a constant between zero and unity.

The cost function in Equation 9 only differs from that in Equation 6 in the first term, which is the weighted sum of squared errors in the 2-dimensional space of wavelength-reflectance pairs, averaged over all the spectra. Therefore, as long as we enforce a common knot vector across all the spectral signatures (or across the spatial dimension of a hyperspectral image), this cost function can also be minimised using the same knot removal procedures in Algorithms 1 and 2.

In principle, a common function basis for all the spectra can be achieved as follows. The common knot vector and the independent parameter value $t_k$ are computed as the average of those of individual spectra, over all the spectra or the spatial dimensions of a hyperspectral image. Furthermore, this operation can be performed in the global interpolation steps in Lines 1 and 22 of Algorithm 1.

The NURBS-based representation provides a means to compression and efficient storage of spectral data and imagery. As described in above, the most straightforward option here is to store the control points and knot vector as an alternative to the raw spectra.

This approach leads to a great reduction in storage. Suppose that we have N spectral signatures in l bands. The number of elements required to store each spectra is n, where n is the number of control points, instead of the number of bands. In addition, the cost to store the knot vector (containing n+p+1 elements, where p is the degree of the basis functions) and the control points' wavelength coordinates (containing n elements), which are common to all the spectra, is negligible. Therefore, the compression ratio is roughly $$\frac{n}{l}.$$

For instance, for a hyperspectral camera delivering hundreds of bands, the storage is reduced from hundreds of bands to tens of them, resulting in about ten times of storage reduction.

The method also permits the interpolation of spectra acquired through sensing devices of different spectral resolutions. This is important since recognition, detection and analysis of materials through hyperspectral sensing is often based upon spectrometers and cameras whose resolution can vary greatly. The interpolation of spectral data through our NURBS-based representation permits spectral signatures to be abstracted to a set of continuous basis functions whose support is local in nature. Thus, a signature acquired through a spectrometer, with, for instance, a spectral resolution of 1 nm can be interpolated in a continuous domain to spectra arising from cameras whose resolution is in the order of 10 nm.

Also, supervised recognition and detection algorithms can be trained on high-resolution spectral signatures and then applied to low-resolution spectral imagery. In a similar fashion, spectra may be operated upon in a continuous domain, where derivative analysis [4] can be effected in a closed, computationally efficient manner.

It will be appreciated by persons skilled in the art that numerous variations and/or modifications may be made to the invention as shown in the specific embodiments without departing from the scope of the invention as broadly described.

For example, the interpolation step can be modified to fix the knots and x-coordinates of the control points, which correspond to the wavelength in the spectra. This will further reduce the overhead of storing redundant wavelength information across image pixels, thus will improve the compression ratio.

The present embodiments are, therefore, to be considered in all respects as illustrative and not restrictive.

REFERENCES

[1] Les Piegl and Wayne Tiller. *The NURBS book*. Springer-Verlag, London, UK, 1995.
[2] E. T. Y. Lee. Choosing nodes in parametric curve interpolation. *Computer-Aided Design*, 21(6):363-370, 1989.

[3] Wayne Tiller. Knot-removal algorithm for NURBS curves and surfaces. *Computer-Aided Design*, 24(8):445-453, 1992.

[4] Z. Fu, A. Robles-Kelly, T. Caelli, and R. Tan. On Automatic Absorption Detection for Imaging Spectroscopy: A Comparative Study. *IEEE Transactions on Geoscience and Remote Sensing*, 45:3827-3844, 2007.

Claims defining the invention are as follows:

1. A computer implemented method of producing a compact representation of spectrum data, utilizing a processor to perform the following steps:
    (a) receiving or accessing the spectrum data comprised of pairs of wavelength and reflectance values;
    (b) interpolating a spline curve to the spectrum data, the spline curve having a set of control points, a knot vector, and representing wavelength values as a first function of an independent parameter and representing reflectance values as a second function of the same independent parameter; and
    (c) removing one or more knots from the knot vector that minimize a cost function in a parameter domain of the spline curve.

2. The method of claim 1, wherein the spline curve is a Non Uniform Rational B-Spline curve (NURBS).

3. The method of claim 1, wherein the minimizing the cost of step (c) is based on the reflectance function.

4. The method of claim 1, wherein the cost, function is defined by squared differences between the spectrum data and the spline curve.

5. The method of claim 4, wherein the cost function is based on the squared differences between the reflectance value from a pair of wavelength and reflectance values, and a reflectance value given by the second function for an independent parameter value that corresponds to the same wavelength value of that pair.

6. The method of claim 5, further comprising the step of determining the independent parameter value that corresponds to the same wavelength value of that pair by performing a search over the first function.

7. The method according to claim 4, wherein the cost function penalizes an increasing number of knots.

8. The method of claim 1, wherein the wavelength and reflectance functions share the same basis functions that are based on the knot vector.

9. The method according to claim 1, wherein step (c) comprises the steps of:
    (i) identifying a set of candidate removable knots;
    (ii) determining an approximate cost reduction removing each candidate knot;
    (iii) selecting a first knot from the set of candidate knots that approximately yields a maximum cost reduction according to the cost function;
    (iv) removing the first knot from the knot vector; and
    (v) removing a pair of wavelength and reflectance values from the spectrum data in the locality influenced by the removed first knot.

10. The method according to claim 9, further comprising:
    removing a pair of wavelength and reflectance values from the spectrum data in the locality of a knot removal in step (c);
    re-sampling the spectrum data in the parameter domain and preferring steps (b) and (c) on the re-sampled spectrum data; and
    determining the approximate cost reduction the removal of each candidate knot will yield by updating each approximate cost reduction by the effect the removal of the previous knot has made.

11. The method according to claim 1, wherein the method further comprises:
    removing a pair of wavelength and reflectance values from the spectrum data in the locality of a knot removed in step (c); and
    re-sampling the spectrum data in the parameter domain and performing step (b) and (c) on the re-sampled spectrum data.

12. The method according to claim 1, wherein reflectance spectrum data is received from a hyperspectral imaging devices and/or spectrometers.

13. The method according to claim 1, wherein the method further comprises the step of providing the compact representation of spectrum data of a first material to an identifier for use in identifying a second material.

14. The method according to claim 1, wherein the method further comprises:
    repeating the method to produce a compact representation of spectrum data of a second material;
    comparing the compact representation of spectrum data of a first and a second material to identify the second material as being the same or different to the first material.

15. The method according to claim 1, wherein the reflectance spectrum of the first material is captured by a device having a different resolution to a device that captured the spectrum data of the second material.

16. The method according to claim 1, wherein the method produces a compact representation of spectrum data of a first material and of spectrum data of a second material, wherein step (b) comprises interpolating spline curves to each of the spectrum data, such that the spline curves share the knot vector, wavelength function and parameter values, and each spline curve has its own reflectance function and control points.

17. The method according to claim 16, wherein minimizing the cost function of step (c) comprises minimizing for each spline curve, minimizing the sum of squared differences between the reflectance value of each pair of wavelength and reflectance values, and a reflectance value given by the reflectance function for the parameter corresponding to the same wavelength averaged over all the, spectra.

18. A non-transitory computer-readable medium having computer-readable instructions, when installed on a computer system cause it to operate in accordance with the method of claim 1 to produce a compact representation of spectrum data.

19. A computer system to produce a compact representation of a spectrum of a first material, the computer system comprising:
    a processor to perform steps (a), (b) and (c) of claim 1; and
    storage means to store the set of control points and a knot vector of the compact representation.

20. The method of claim 1, wherein the spectrum data is in the form of a spectral signature comprised of wavelength-indexed data representative of reflectance and/or radiance.

21. The method of claim 1, wherein each of the pairs of wavelength and reflectance values comprises a wavelength value from which the wavelength may be ascertained and a reflectance value from which a reflectance may be ascertained.

* * * * *